May 29, 1956     E. L. BOTTEMILLER     2,748,295
GENERATOR CONTROL SYSTEM
Filed July 23, 1953
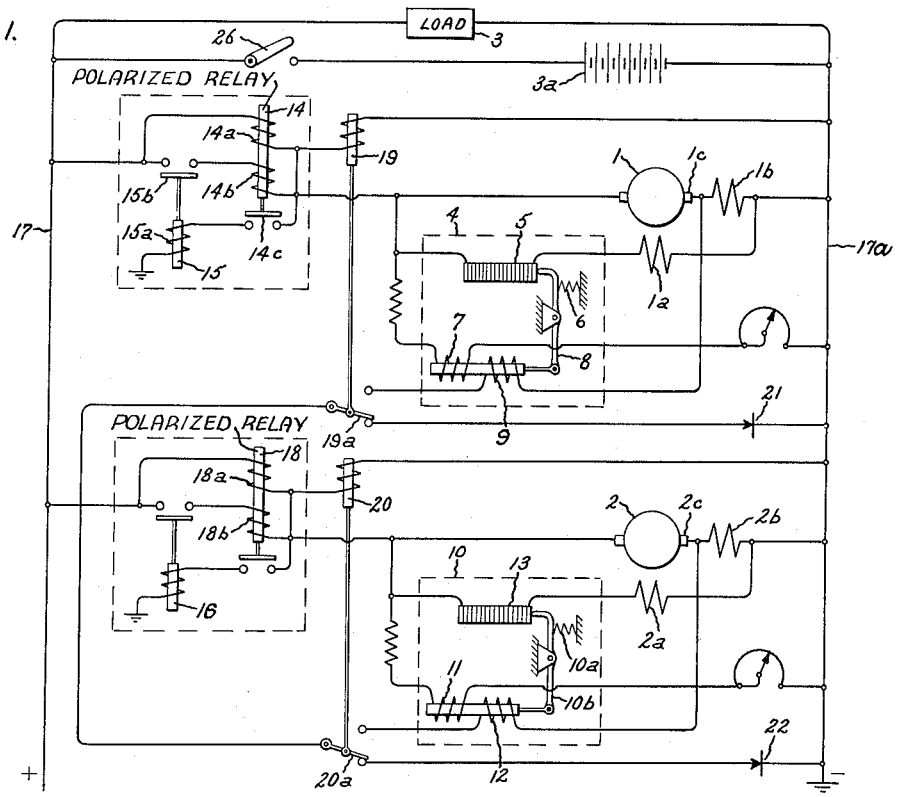
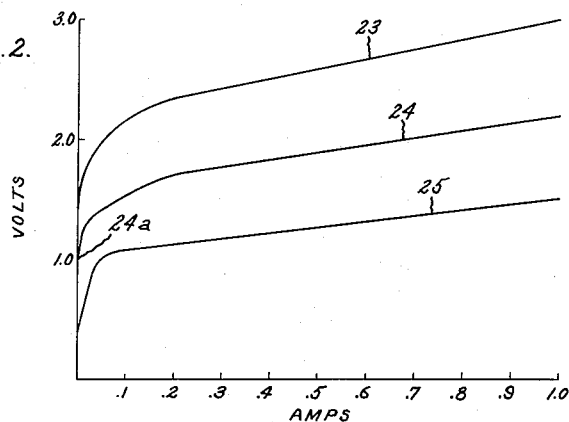
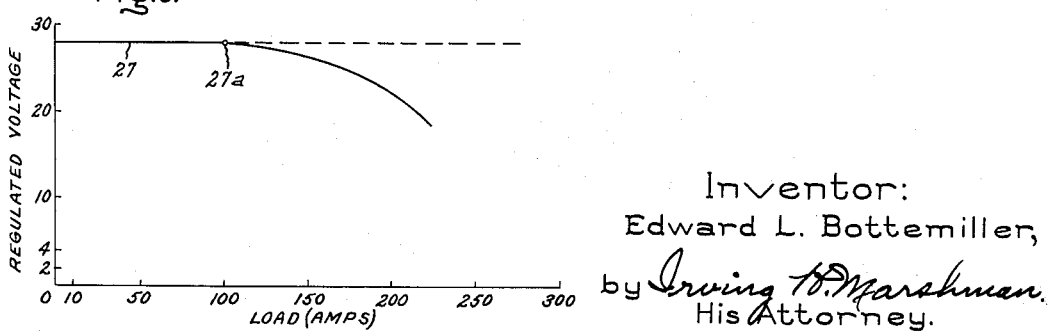
Inventor:
Edward L. Bottemiller,
by Irving B. Marshman.
His Attorney.

United States Patent Office 2,748,295
Patented May 29, 1956

2,748,295

GENERATOR CONTROL SYSTEM

Edward L. Bottemiller, Schenectady, N. Y., assignor to General Electric Company, a corporation of New York Application July 23, 1953, Serial No. 369,797

5 Claims. (Cl. 307—84)

This invention relates to control systems, more particularly to systems for controlling the generation of electric power, and it has for an object the provision of a simple, reliable and improved system of this character. Still more particularly, the invention relates to systems for controlling a plurality of parallel operated direct current generators which are provided with voltage regulators that are interconnected to produce a predetermined division of load between them.

In electric power systems such for example as are used on certain types of land vehicles two direct current generators are provided for supplying auxiliary power. Each of these generators is individually driven by a separate engine. At times both of the engines may be operating and the generators are connected in parallel to supply a common load. At other times one of the engines may be stopped and its generator disconnected from the load. When both generators are operating in parallel, the speeds of the engines may vary widely tending to disturb proper division of the load between them. The desired load division is maintained, however, by providing the voltage regulators with equalizing windings which are connected in an equalizing circuit from a point in the armature circuit of one of the generators to a corresponding point in the armature circuit of the other. If the engine which drives one of the generators is stopped or if for any reason the voltage of such generator decreases below a predetermined value, e. g., 75 per cent of rated full voltage, such generator is disconnected from the system and the equalizing circuit between it and the active generator is interrupted. Consequently the entire load of the system is carried by the connected active generator and accordingly a further object of the invention is the provision of means for imparting a droop to the characteristic of the voltage regulator of the active generator so that such generator will not be overloaded.

A still further object of the invention is the provision of means for limiting the drooping voltage characteristic of the regulator to a range of values of load current in excess of a predetermined value so that full voltage will be maintained on the system for all values of load current less than such predetermined value.

In carrying the invention into effect in one form thereof a main generator and an auxiliary generator, each driven by a separate engine, are provided for operation in parallel with each other to supply a common load, and each is provided with its own voltage regulator to maintain its voltage constant at a predetermined value. In order to prevent changes in engine speeds or tendencies of the generator voltages to vary, each voltage regulator is provided with an equalizing coil and these coils are connected in an equalizing circuit which is connected from a point in the armature circuit of one of the generators to a corresponding point in the armature circuit of the other. Means are also provided for disconnecting either generator from the system if its voltage decreases below a predetermined value. In order to prevent the connected active generator from becoming overloaded as a result of the operation of its regulator to maintain constant voltage means responsive to disconnection of the other generator from the system are provided for connecting the equalizing coil of the regulator for the active generator to be responsive to its armature load current and to have such polarity as to cause the operating characteristic of such regulator to droop. In other words, the energization of the coil is such as to cause the regulator to maintain progressively lower values of voltage for increasing values of load current. To prevent the coil from imparting a drooping characteristic to the regulator for all values of load current, a non-linear resistor is included in the circuit with the coil to prevent the flow of current in the coil circuit until a predetermined value of generator load current has been exceeded thereby imparting to the regulator a current limiting action.

For a better and more complete understanding of the invention reference should now be had to the following specification and to the accompanying drawing of which, Fig. 1 is a simple schematic diagram of an embodiment of the invention; and Figs. 2 and 3 are charts of characteristic curves which facilitate an understanding of the invention.

Referring now to the drawing, a main generator 1 and an auxiliary generator 2 are provided for supplying electric power to a load 3 and charging current to a storage battery 3a. The main generator 1 is provided with a shunt field winding 1a and a series compensating field winding 1b and similarly the auxiliary generator 2 is provided with a shunt field winding 2a and a series compensating field winding 2b. These generators are driven at speeds which are preferably substantially constant by suitable driving means such for example as internal combustion engines which are not illustrated in the drawing.

For the purpose of maintaining the voltage of the main generator 1 substantially constant, a voltage regulating device 4 is provided. It comprises a stack of carbon washers 5 which are normally compressed by means of a spring 6 to reduce the resistance of the stack to a low value. It also is provided with a voltage coil 7 which is connected across the armature and series compensating field winding 1b of generator 1. The carbon washer stack 5 is connected in series circuit relation with the shunt field winding 1a of the main generator. When voltage is applied to the voltage coil, it causes the pivoted armature 8 of the regulator to rotate in a clockwise direction against the tension of the spring to relieve pressure on the carbon stack and thus to insert sufficient resistance in the shunt field circuit of the generator to regulate the voltage at a predetermined value. The voltage regulator 4 is also provided with an equalizing coil 9 which is preferably wound on the same spool with the voltage coil. Thus by applying to the voltage coil a voltage of such polarity that the magnetomotive forces of the coils 7 and 9 are additive, the value of the regulated voltage is decreased. Conversely by applying a voltage of reverse or opposing polarity to the equalizing coil, the value of the regulated voltage is correspondingly increased.

A similar voltage regulator 10 is provided for the auxiliary generator 2. It has a voltage coil 11, an equalizer coil 12 and a carbon stack 13 which is connected in series with the shunt field winding 2a of the auxiliary generator 2.

For the purpose of preventing the connection of the main generator to the system unless its voltage is slightly greater than the system voltage a reverse current unit is provided which comprises a polarized relay 14 and a power contactor 15. The polarized relay has a differential voltage coil 14a and a reverse current coil 14b. The reverse current coil is connected in series relationship with the armature of the main generator 1 between its positive terminal and the main contact 15b of the power contactor. The differential voltage coil 14a is connected in a parallel circuit between the positive armature terminal of the generator and the positive bus 17 of the system of which the negative bus is a ground connection 17a.

When the generated voltage of the main generator is greater than the system voltage by approximately ½ volt the differential voltage coil becomes sufficiently energized in the correct polarity to cause the polarized relay 10 to close its contact 14c to complete an energizing circuit for the operating coil 15a of the power contactor. In response to energization, the power contactor closes its contact 15b to connect the positive terminal of the generator to the positive bus 17. In closing, the contact 15b of the power contactor short circuits the differential voltage coil 14a of the polarized relay which however remains picked up by the reverse current coil 14b. As long as the generator voltage remains greater than the bus voltage, the generator delivers current to the load 3 on the bus and the main contactor 15 remains closed. If the generator speed is reduced so that the voltage of the generator becomes less than the system voltage, the series reverse current coil 14b of the polarized relay causes the relay contacts 14c to open and thereby deenergize the power contactor 15 which thereupon opens and disconnects the generator from the positive bus.

The auxiliary generator 2 is provided with a similar reverse current unit which comprises a reverse current relay 18 and a power contactor 16 which are preferably identical with the relay 14 and the contactor 15 respectively.

For the purpose of causing the main generator 1 and the auxiliary generator 2 to divide the load in a predetermined ratio, preferably equally, an equalizing circuit is connected between the generators. This equalizing circuit is connected between convenient corresponding points of the two generators. For example it may be connected from the point 1c between the negative brush and the series compensating field winding of the main generator to the corersponding common terminal 2c of the auxiliary generator as illustrated in the drawing. This equalizing circuit includes the equalizing coil 9 of main generator voltage regulator 4, the contacts 19a of a main paralleling relay 19, the contacts 20a of the auxiliary paralleling relay 20 and the equalizer coil 12 of the auxiliary generator voltage regulator 10.

When the voltage of either generator decreases to the value at which its reverse current relay responds to disconnect it from the system bus, its paralleling relay interrupts the equalizing circuit and connects the equalizing coil of the regulator for the active generator in a local circuit across the series compensating field winding of such active generator. The connection is made so that the magnetization of the equalizer coil is poled to add to the magnetization of the voltage coil and thus to introduce a droop in the characteristic of the regulator and to limit the current which the active generator is permitted to supply to the system to a reasonably safe value. Since the voltage drop across the compensating field winding of either generator is proportional to its load current the amount of droop which the equalizer coil introduces in the characteristic of its voltage regulator is a function of the load on the generator.

In order that no droop shall be introduced into the characteristic of the regulator of the active generator until its load current has equalled or exceeded a permissible value, means are provided for controlling the excitation of the equalizer coil to prevent current flow until the voltage across the coil which is a measure of the generator load current reaches a predetermined value, and for voltages greater than such predetermined value to permit the current in the coil to increase rapidly with further increases in the generator load current. Preferably this means takes the form of a selenium rectifier having a non-linear resistance characteristic connected in circuit with the equalizing coil of the voltage regulator of the active generator. Thus there is provided a non-linear resistor in the form of a selenium rectifier 21 which is connected in series with the equalizing coil 12 of regulator 10 for auxiliary generator 2 by means of main paralleling relay 19 when the main generator is disconnected from the load. Similarly, there is provided a selenium disk rectifier 22 which is connected in circuit with the equalizing coil 9 of the voltage regulator 4 for the main generator by means of auxiliary paralleling relay 20 when the auxiliary generator 2 is disconnected from the load.

The non-linear volt-ampere characteristic of selenium rectifiers in the forward direction is illustrated by a chart of characteristic curves in Fig. 2 in which ordinates represent volts and abscissae represent current. In this chart, the curve 23 represents the non-linear characteristic of four selenium disks in series; curve 24 represents the characteristic of three selenium disks in series and curve 25 represents the characteristic of two selenium disks in series.

With the foregoing understanding of the elements and their organization, the operation of the system will readily be understood from the following description. It is assumed that each of the non-linear resistors 21 and 22 comprises three selenium disks connected in series relationship and that its volt-ampere characteristic is represented by the curve 24 of Fig. 3. The master switch 26 is closed to connect the positive terminal of the storage battery 3a to the positive system bus 16. It is assumed that the engines (not shown) which drive the main and auxiliary generators 1 and 2 are operating at full rated speed as a result of which the polarized differential voltage relays 14 and 18 are picked up and the corresponding power contactors 15 and 16 are closed to connect the generators 1 and 2 to the bus 16. With the generators operating at full rated voltage, the main and auxiliary paralleling relays 19 and 20 are picked up to complete the equalizing circuit from the terminal 1c of generator 1 to the corresponding terminal 2c of generator 2. As long as the generators are dividing the system load equally or in some other predetermined ratio, the voltage drops across the compensating field windings 1b and 2b will be equal and the voltages of the terminals 1c and 2c will be equal. Consequently, no current will flow in the equalizing circuit and no droop or boost will be added to the characteristic of either the main generator voltage regulator 4 or the auxiliary generator voltage regulator 10.

However, if the speed of one of the engines, e. g., that which drives the auxiliary generator 2 should decrease, the voltage of the generator 2 would tend momentarily to decrease correspondingly, thus allowing the main generator to assume more than its share of the load. As a result, the terminal 1c would become more positive than terminal 2c and current would flow in the equalizing circuit from the more positive to the more negative terminal. The current in the equalizer coil 9 would flow in such a direction that the magnetomotive force of the coil would add to that of the voltage coil 7. As a result the armature 8 would be attracted to relieve pressure on the carbon stack 5 and thus to weaken the field of the main generator and decrease its voltage. Conversely, the current in the equalizer coil 12 is in such a direction that its magnetomotive force opposes that of the voltage coil 11. Thus the pull of the coils on the armature 10a is weakened thereby allowing the spring 10b to compress the stack 10 still farther and thereby strengthen the field of the auxiliary generator 2 and correspondingly increase its voltage and finally the system reaches a new stage of equilibrium with the generators dividing the load approximately equally.

If one of the engines which drives the generators should be stopped or its speed reduced below a predetermined value its generator is disconnected from the system. For example, if the engine which drives the auxiliary generator 2 is stopped or its speed reduced below a predetermined value, e. g. 75 per cent of minimum rated speed the reversed current in the coil 18b will deenergize and drop out the reverse current relay 18 which in turn will denergize and drop out the power contactor 16 to disconnect the auxiliary generator from the bus 17. The decrease of the generator voltage below a predetermined value, e. g. 75 per cent rated full voltage causes the auxiliary paralleling relay 20 to drop out and open its normally open contacts to interrupt the equalizing circuit and to close its normally closed contacts to complete a circuit for the equalizing coil 9 of the main generator voltage regulator across the series compensating field winding 1b with the non-linear resistor 22 included in the circuit.

As long as the load current of the generator is below a predetermined value, e. g. a value at which the voltage drop across the compensating field winding does not exceed the value represented by the ordinate of point 24a of curve 24, the non-linear resistor 22 prevents current from flowing in the circuit of equalizing coil 7. As a result, the regulator 4 operates to maintain the voltage of the main generator 1 constant. This is illustrated by the horizontal portion of the curve 27 of Fig. 3 of which ordinates represent the generator voltage and abscissae represent the system load in amperes.

If the load increases further and exceeds full value, the voltage drop across the series compensating field winding 1b will equal or exceed the value which is represented by the ordinate of point 24a of curve 24. Consequently, current will flow in the circuit of the equalizing coil 9 in a direction such that its magnetomotive force adds to that of the voltage coil. This increases the pull on the armature 8 and correspondingly relieves the pressure on the carbon stack 5. As a result, the field of the main generator 1 is weakened and its voltage is correspondingly decreased. This decrease in voltage is illustrated by the portion of the curve 27 of Fig. 3 which departs from the horizontal. In other words, when the load current increases beyond the predetermined value represented by the abscissa of point 27a of curve 27, the non-linear resistor 22 permits current to flow in the equalizer coil circuit and imparts a droop to the characteristic of the regulator and thus limits the current of the generator, when operating singly, to a predetermined permissible value.

If, while the main generator and the auxiliary generator are operating in parallel, the main generator voltage decreases below the predetermined value, the main generator will be disconnected from the system and the non-linear resistor 21 will be connected in the circuit of the equalizer coil 12 of the auxiliary generator voltage regulator 10 to impart to it the drooping characteristic which is represented by curve 27. As a result, the regulator will function to limit the output current of the auxiliary generator in the manner described in the foregoing in connection with the operation of the main generator 1.

Thus, when either generator is operating alone, the drooping circuit is effective. However, when both generators are operating in parallel the drooping circuit is inactive and is not needed since with two generators operating in parallel to supply the load double generating capacity is available.

Although in accordance with the provisions of the patent statutes this invention is described as embodied in concrete form and the principle thereof has been explained together with the best mode in which it is now contemplated applying that principle it will be understood that the apparatus shown and described is merely illustrative and that the invention is not limited thereto since alterations and modifications will readily suggest themselves to persons skilled in the art without departing from the true spirit of the invention or from the scope of the annexed claims.

What I claim as new and desire to secure by Letters Patent of the United States is:

1. In combination, main and auxiliary generators for supplying power to a common load, a pair of voltage regulators, one for each of said generators and responsive to its voltage for controlling its excitation, an equalizer circuit connection from an armature terminal of one of said generators to the corresponding terminal of the other, means for modifying the action of said regulators to effect a predetermined division of load between said generators comprising an auxiliary winding on each of said regulators, said auxiliary windings being connected in said equalizer circuit connection, a separate non-linear resistance electrically associated with each of said regulators, means responsive to reversal of current in the armature circuit of one of said generators for disconnecting it from the load circuit, means responsive to a decrease in the voltage of said disconnected generator for interrupting said equalizer circuit connection and completing a circuit responsive to the armature current of the other of said generators including the auxiliary winding of its voltage regulator with said auxiliary winding poled to effect a droop in its voltage characteristic and also including one of said non-linear resistances for limiting the response of the non-linear resistance included in said circuit to values of armature current in excess of a predetermined value thereby to provide current limiting operation of the regulator of the active generator.

2. In combination, main and auxiliary generators for supplying power to a common load, a first voltage regulator responsive to the voltage of said main generator for controlling its excitation, a second voltage regulator responsive to the voltage of said auxiliary generator for controlling its excitation, said regulators having interconnected auxiliary windings effective to cause the regulators to maintain a predetermined division of load between said generators, switching means associated with each of said generators for disconnecting its associated generator from said load, a separate non-linear resistor operatively associated with each of said regulators, and switching means responsive to the disconnection of one of said generators from said load for interrupting the interconnection between said auxiliary windings and for connecting the auxiliary winding of the regulator associated with the other of said generators in series relationship with one of said non-linear resistors in a circuit responsive to the armature current of said other generator and poled to cause said last mentioned regulator to have a drooping characteristic.

3. In combination, main and auxiliary generators for supplying power to a common load, a pair of voltage regulators, one for each of said generators and responsive to its voltage for controlling its excitation, said regulators being provided with interconnected auxiliary windings for modifying the action of said regulators to effect a predetermined division of load between said generators, a separate non-linear resistor operatively associated with each of said regulators and switching means responsive to a predetermined value of an operating characteristic of one of said generators for interrupting the interconnection between said auxiliary windings and for connecting the auxiliary winding of the regulator associated with the other of said generators in series relationship with one of said non-linear resistors in a control circuit responsive to the armature current of said other generator and poled to impart to said last mentioned regulator a drooping characteristic.

4. In combination, main and auxiliary generators for supplying power to a common load, a first voltage regulator responsive to the voltage of said main generator for controlling its excitation, a second voltage regulator responsive to the voltage of said auxiliary generator for controlling its excitation, said regulators having interconnected auxiliary windings effective to cause the regulators to maintain a predetermined division of load between said generators, switching means associated with each of said generators for disconnecting its associated generator from said load, a separate rectifier operatively associated with each of said regulators having a nonlinear resistance characteristic of which the forward resistance is relatively large for a predetermined range of relatively low values of applied voltage and relatively low for a predetermined range of relatively high values of applied voltage, and switching means responsive to the disconnection of one of said generators from said load for interrupting the interconnection between said auxiliary windings and for connecting the auxiliary winding of the regulator associated with the other of said generators in series relationship with one of said non-linear rectifiers in a circuit responsive to the armature current of said other generator and poled to cause said last mentioned regulator to have a drooping characteristic.

5. In combination, main and auxiliary generators for supplying power to a common load, a first voltage regulator responsive to the voltage of said main generator for controlling its excitation, a second voltage regulator responsive to the voltage of said auxiliary generator for controlling its excitation, said regulators having interconnected auxiliary windings effective to cause the regulators to maintain a predetermined division of load between said generators, switching means associated with each of said generators for disconnecting its associated generator from said load, a separate rectifier operatively associated with each of said regulators having a non-linear resistance characteristic of which its forward resistance is substantially infinite for a range of values of applied voltage from zero to a predetermined threshold value, is relatively high for a predetermined intermediate range of relatively low values of applied voltage and is relatively low for a predetermined range of relatively high values of applied voltage, and switching means responsive to the disconnection of one of said generators from said load for interrupting the interconnection between said auxiliary windings and for connecting the auxiliary winding of the regulator associated with the other of said generators in series relationship with one of said rectifiers in a circuit responsive to the armature current of said other generator and poled to cause said last mentioned regulator to have a drooping characteristic.

References Cited in the file of this patent

UNITED STATES PATENTS

| Number | Name | Date |
|---|---|---|
| Re. 20,317 | Suits | Mar. 30, 1937 |
| Re. 23,351 | Fell | Apr. 3, 1951 |
| 1,082,111 | Creveling | Dec. 23, 1913 |
| 1,293,720 | Creveling | Feb. 11, 1919 |
| 2,072,784 | Wingo | Mar. 2, 1937 |
| 2,075,105 | Evans | Mar. 30, 1937 |
| 2,401,795 | Rady | June 11, 1946 |
| 2,447,655 | Kirshbaum | Aug. 24, 1948 |
| 2,448,442 | Kirshbaum | Aug. 31, 1948 |
| 2,483,117 | Almassy | Sept. 27, 1949 |
| 2,494,397 | Lusk | Jan. 10, 1950 |
| 2,606,945 | Gillespie | Aug. 12, 1952 |
| 2,616,054 | Rady | Oct. 28, 1952 |
| 2,650,341 | Jones | Aug. 25, 1953 |
| 2,671,175 | Gillespie | Mar. 2, 1954 |